(12) United States Patent
Aganoglu et al.

(10) Patent No.: US 10,018,784 B2
(45) Date of Patent: Jul. 10, 2018

(54) FIBER-OPTIC DEVICE AND PROCESS FOR MANUFACTURING THE DEVICE

(71) Applicant: LEONI KABEL HOLDING GMBH, Nuremberg (DE)

(72) Inventors: Ruzin Aganoglu, Berlin (DE); Holger Arendt, Rangsdorf (DE); Alexander Heinze, Berlin (DE); Benno Kurt, Eiche (DE)

(73) Assignee: LEONI Kabel Holding GmbH, Nuremburg (DE)

( * ) Notice: Subject to any disclaimer, the term of this patent is extended or adjusted under 35 U.S.C. 154(b) by 17 days.

(21) Appl. No.: 15/137,138

(22) Filed: Apr. 25, 2016

(65) Prior Publication Data

US 2016/0313506 A1 Oct. 27, 2016

(30) Foreign Application Priority Data

Apr. 24, 2015 (DE) .................. 10 2015 207 611

(51) Int. Cl.
| | |
|---|---|
| *G02B 6/26* | (2006.01) |
| *G02B 5/02* | (2006.01) |
| *F21V 8/00* | (2006.01) |
| *G02B 6/02* | (2006.01) |

(52) U.S. Cl.
CPC ........... *G02B 6/262* (2013.01); *G02B 5/0242* (2013.01); *G02B 6/001* (2013.01); *G02B 6/02395* (2013.01)

(58) Field of Classification Search
CPC ...................................................... G02B 6/26
USPC ......................................................... 385/33
See application file for complete search history.

(56) References Cited

U.S. PATENT DOCUMENTS

| | | | | | |
|---|---|---|---|---|---|
| 4,422,719 | A | * | 12/1983 | Orcutt ............... | B29D 11/00711 362/562 |
| 4,761,047 | A | * | 8/1988 | Mori .................... | A61N 5/0616 36/137 |
| 4,936,663 | A | | 6/1990 | Mori | |
| 5,432,876 | A | * | 7/1995 | Appeldorn ............. | G02B 6/001 362/554 |
| 5,987,199 | A | * | 11/1999 | Zarian ...................... | B26D 3/06 362/559 |
| 6,014,489 | A | * | 1/2000 | Johanson ............. | G02B 6/0096 362/331 |
| 6,299,338 | B1 | | 10/2001 | Levinson et al. | |
| 6,385,507 | B1 | * | 5/2002 | Buijtels ............ | G01N 21/95684 219/267 |
| 6,563,993 | B1 | | 5/2003 | Imamura et al. | |

(Continued)

FOREIGN PATENT DOCUMENTS

| | | |
|---|---|---|
| DE | 102011119662 A1 | 5/2012 |
| DE | 102013015907 A1 | 3/2015 |

(Continued)

*Primary Examiner* — Kaveh C Kianni
(74) *Attorney, Agent, or Firm* — Laurence A. Greenberg; Werner H. Stemer; Ralph E. Locher

(57) ABSTRACT

A fiber-optic device is particularly suitable for medical or industrial applications. The device has an optical fiber, which extends in a longitudinal direction to a distal end, and which has a core. A diffuser segment is provided for radially decoupling light from the fiber. The diffuser segment has a plurality of, in particular macroscopic, scattering elements. The scattering elements project into the core for radial decoupling of light. A process for the manufacture of the device is described as well.

24 Claims, 4 Drawing Sheets

(56) References Cited

U.S. PATENT DOCUMENTS

| | | | |
|---|---|---|---|
| 7,654,679 B2 | 2/2010 | Mezouari | |
| 7,991,257 B1 * | 8/2011 | Coleman | B29D 11/0073 264/1.24 |
| 8,619,363 B1 * | 12/2013 | Coleman | G02B 5/18 359/576 |
| 2002/0030999 A1 | 3/2002 | Lundin | |
| 2003/0190120 A1 * | 10/2003 | Ziegenhagen | A61N 5/0601 385/31 |
| 2003/0210222 A1 * | 11/2003 | Ogiwara | G02B 6/0036 345/103 |
| 2006/0193578 A1 * | 8/2006 | Ouderkirk | B29C 47/0004 385/115 |
| 2006/0193593 A1 * | 8/2006 | Ouderkirk | B82Y 20/00 385/147 |
| 2009/0210038 A1 | 8/2009 | Neuberger et al. | |
| 2012/0163013 A1 * | 6/2012 | Buelow, II | G02B 6/001 362/555 |
| 2013/0343079 A1 * | 12/2013 | Unger | F21K 9/61 362/555 |
| 2015/0029741 A1 * | 1/2015 | Lee | G02B 6/0096 362/551 |
| 2015/0160394 A1 | 6/2015 | Nakano et al. | |

FOREIGN PATENT DOCUMENTS

| | | |
|---|---|---|
| GB | 2185188 A | 7/1987 |
| GB | 2222273 A | 2/1990 |
| GB | 2447936 A | 10/2008 |
| WO | 2013191690 A1 | 12/2013 |
| WO | 2014020844 A1 | 2/2014 |

\* cited by examiner

FIBER-OPTIC DEVICE AND PROCESS FOR MANUFACTURING THE DEVICE

CROSS-REFERENCE TO RELATED APPLICATION

This application claims the priority, under 35 U.S.C. § 119, of German patent application DE 10 2015 207 611.3, filed Apr. 24, 2015; the prior application is herewith incorporated by reference in its entirety.

BACKGROUND OF THE INVENTION

Field of the Invention

The invention pertains to a fiber-optic device and to a process for the manufacture of this type of device. The fiber-optic device is, in particular, also referred to as a diffuser.

The fiber-optic device serves first and foremost to radiate light into a specific spatial area and is regularly used for irradiation in the framework of medical processes such as for thermal treatment or ablation of tissues, especially, for example, within the body and in the case of alternative applications outside the body too.

The device, in general, comprises an optic fiber into which light is coupled at a first end, which is usually connected to a light source. The coupled light is first guided in the longitudinal direction of the fiber to a second, distal end and decoupled in the radial direction from the fiber at a specific location in a diffuser segment, typically at the distal end or in its vicinity. For this to happen, the fiber has to be prepared correspondingly at this location in order to reduce total reflection usually used for guiding of light within the fiber and instead decouple at least a portion of the light in the radial direction.

Embedding of scattering particles into the fiber that can scatter guided light in the fiber in such a manner that the angle of total reflection is fallen short of and light is, consequently, additionally decoupled from the fiber in the radial direction is described, for example, in U.S. patent application publication US 2009/0210038 A1.

SUMMARY OF THE INVENTION

It is accordingly an object of the invention to provide a fiber-optic device and a related production method which overcome the above-mentioned and other disadvantages of the heretofore-known devices and methods of this general type and which provides for an improved fiber-optic device that ensures the most homogeneous light emission during operation. A process that is the simplest possible manufacturing process is specified, in addition.

With the foregoing and other objects in view there is provided, in accordance with the invention, a fiber-optic device, comprising:

an optical fiber extending in a longitudinal direction to a distal end, said optical fiber having a core;

a diffuser segment formed with a plurality of scattering elements projecting into said core and being configured for radially decoupling light from the optical fiber.

The fiber-optic device is particularly suited for medical applications. The device comprises an optical fiber, which extends in a longitudinal direction towards a distal end, and a core. The fiber, furthermore, has a diffuser segment in which a number of particularly microscopic scattering elements are located, which respectively project into the core for radial decoupling of light.

Advantages achieved by the invention particularly are that scattering elements are, on the one hand, especially easy to manufacture, preferably by means of a laser machining process and, on the other hand, facilitate an especially controlled emission of light in the radial direction. Scattering elements thereby respectively and particularly exhibit macroscopic expanse dimension, whereby the fact that the expansion or size of the individual scattering elements is significantly greater than the wavelength of the light guided in the core, preferably by approximately 1 to 4 order of magnitude, especially by approximately 2 to 3 order of magnitude, is to be understood by the term "macroscopic." The scattering elements thereby build boundaries with the core that are orientated in such a manner that incoming light comes in at an angular range that does not fulfill the condition for total reflection. Light that is guided in the core undergoes diversion or even scattering at these boundaries due to which, when compared to a fiber without scattering elements, a greater amount of light is decoupled in the radial direction, i.e. perpendicular to the longitudinal direction, from the fiber and into the surrounding area of the same. The scattering elements then, in particular, advantageously and respectively form a type of micro lens due to the boundaries and their properties.

As a result of the appropriate configuration of the scattering elements with regard to their dimensions, geometry and location with regard to the fiber, an especially homogeneous radiation is, furthermore, achieved in the sense of an especially uniform, especially constant intensity distribution. The scattering elements are, thereby, particularly designed as individual indentations, pockets or even notches that are distributed separately on the surface area i.e. fiber surface area. The surface area of the fiber is, therefore, especially structured in the diffuser segment.

The device is, on the whole, also termed a diffuser particularly due to the homogeneous radial light emission on the diffuser segment. In operation, light is then coupled from a light source at a first end of the fiber. In addition, a suitable coupling or plug-in connection is provided and preferably also affixed at the first end that is also termed as the proximal end or coupling end, through which the fiber can be connected to the light source. The light source is preferably a laser or, alternatively, a lamp and, in particular, exhibits a central wavelength in the range of 400 to 2300 nm. The fiber typically has a diameter in the range of 125 to 1500 µm and particularly in the range of 500 to 700 µm.

Light that is coupled into the fiber first propagates in the longitudinal direction from the first end to a second end of the fiber, which is also termed the distal end or the decoupling end. The fiber is therefore designed as a normal segment or a supply segment up to the diffuser segment, preferably as a conventional fiber for guiding of light with the help of total reflection and, for this purpose, particularly exhibits a sheath surrounding the core with minimal refractivity.

The fiber is preferably manufactured from fused quartz glass, whereby the sheath is manufactured from fluorinated fused quartz glass. Only the core is manufactured from fused quartz glass and enclosed by a sheath made from a polymer such as a fluoropolymer in a suitable alternative. The fiber is then, in particular, a so-called PCS fiber i.e. plastic clad silica fiber or HPCS fiber i.e. hard plastic clad silica fiber. A fiber that is completely manufactured from a polymer, a so-called polymer-optic fiber, POF being the short form, is basically also suitable.

The diffuser segment, which is preferably located at the end of the fiber and consequently then also forms an end segment with the same, is attached to the normal segment in the longitudinal direction. The diffuser segment is preferably a few centimeters to a few tens of centimeters and particularly 1 to 30 cm or 1 to 10 cm long. The device is then suitable for intra-corporeal medical applications such as ablation of tumorous tissue or calcification of inner vascular walls for example.

The scattering elements particularly serve to disrupt conventional guiding of light by means of total reflection and, thereby, advantageously produce an increased amount of light guidance and decoupling from the fiber on the diffuser segment. This effect is essentially produced by boundaries of the scattering, which, beginning with the surface area of the fiber, projects right through something like a sheath and in to the core.

During the manufacture of the device in a first preferred variant, a conventional fiber is, in particular, destroyed in the area of the scattering elements to be manufactured and the fiber is, thereby, degraded so that a corresponding recess can be generated in the fiber for the formation of the scattering elements. The scattering elements therefore respectively exhibit a recess in this configuration. This recess is first filled with air in particular so that a boundary is formed with the corresponding refractive index between the recess and core. The trajectory of this boundary, thereby, advantageously differentiates itself greatly from the trajectory of the boundary layer between the core and sheath that is, in general, directed in the longitudinal direction due to which light guided into the core strikes the newly formed boundary layer at a correspondingly different angle.

The scattering elements in a second preferred variant are respectively designed as a region of the core with a modified refractive index. The respective regions are, in particular, thereby spatially separated from one another. As a result of this in situ modification of the refractive index within the core, boundary layers are then advantageously formed between the unaffected part of the core and a respective region, which results in a deflection of the light guided in the core, as already described above in connection with the recesses. The amount of the light that is scattered out of the fiber is thus increased considerably.

Various processes are, in principle, suited to the production of a modified refractive index. A first process consists of machining the fiber with a laser beam, which preferably results in an in situ warming of the fiber so that the material structure and, consequently, the refractive index of the core in the irradiated region change. The core is quasi in situ i.e. melted or surface-fused to the locations of the later scattering elements. The fiber then exhibits respective regions of the core as scattering elements, which have each been treated thermally, especially by means of a laser. Laser machining is, consequently, preferably essentially thermal machining. $CO_2$ laser is particularly suited for this purpose. In contrast, in situ ion implantation for the formation of regions with a modified refractive index, takes place in the case of a second process for modification of the refractive index. The fiber then exhibits corresponding scattering elements that are manufactured from the core by the addition of ions of an additional material.

In order to further improve scattering of light, a scattering material is applied at least region-wise on the fiber in a preferred improvement, said scattering material exhibiting a matrix with scattering particles embedded therein, especially in the area of the scattering element. The scattering particles thereby serve to scatter light. Light decoupled from the fiber is then advantageously scattered by the scattering particles, due to which homogeneity of radiation of light in the diffuser segment is improved. Since intensified decoupling of light takes place in the region of the scattering elements, arranging the scattering material in this area is particularly sensible.

The recesses are, in particular, completely filled with the scattering material in another advantageous improvement. As a result, light coupled in this through the boundary layer of a respective recess is, advantageously, additionally scattered and radiation of light is, consequently, more homogeneous on the whole. Penetration of dirt or foreign bodies is, in addition, effectively prevented by filling the recesses with material as is, in some circumstances, accompanying performance degradation due to light absorption, for example.

In a particularly preferred configuration, the fiber is continuously coated with the scattering material i.e. continuously on the diffuser segment and, in particular, not on the normal segment. This continuous application of the scattering material effectively as a scattering sheath, which envelops the fiber in the region of the diffuser segment, on the one hand preferably produces a smooth surface area of the fiber i.e. a constant diameter of the fiber in particular and, on the other hand, also an especially homogeneous light radiation in the region of the scattering elements as well as in the intermediate, free regions. Continuous application of the scattering material is, in addition, considerably simpler from the point of view of manufacturing technique when compared to only in situ application. The scattering material is preferably applied with a wall thickness in the range of 1 to 10 μm.

The sheath of the fiber is preferably and particularly removed before application of the scattering material and removed at, at least, one region at which the scattering material will subsequently be applied. The scattering material is thus applied directly onto the core. The evanescent field of the light guided in the core then penetrates directly through the scattering sheath formed by the scattering material without being additionally distanced from the now-removed sheath. The scattering effect of the scattering material is strengthened considerably in this manner. In doing so, a fiber with a sheath made from polymer, since the same can, in particular, be easily removed, is particularly preferred. A fiber without sheath alternatively serves immediately as a starting product for the manufacture of the device.

Scattering particles are preferably designed as nanoparticles i.e. as atom agglomerates with a spatial expansion of less than 1 μm, i.e. at the most in the order of magnitude of the wavelength of the light to be scattered but preferably thereunder. The nanoparticles exhibit an average diameter lying in the range of 10 to 100 nm in a preferred configuration, especially preferred in the range of 20 to 50 nm, and are consequently, in particular, one or two orders of magnitude less than the wavelength of the light to be scattered. In the case of scattering of these nanoparticles, the same mainly deals in particular with Rayleigh scattering, whereas the scattering elements have larger dimensions than the wavelength of the light and primarily lead to Mie scattering. This combination of nanoparticles, which are microscopic in relation to the wavelength and macroscopic scattering elements as scattering centers, produces optimal homogenization of the light radiated by the device in the diffuser segment and leads to a particularly constant intensity distribution in the longitudinal direction.

Particles from a metal oxide, especially from aluminum oxide, which is particularly cost effective and, in addition, also exhibits chemical properties during embedding of the scattering material into the matrix are suitable as nanoparticles. The matrix is preferably made using a base material which is transparent with regard to the light guided in the fiber i.e. particularly exhibits an absorption of less than 10%. The matrix is preferably manufactured from one material that is suitable for an optically effective fiber coating, especially a polymer i.e. plastic, for designing the fiber as a PCS fiber i.e. plastic clad silica fiber, or as an HPCS fiber i.e. hard plastic clad silica fiber. A particularly firm mechanical connection results when filling in the recesses with a scattering material based on a polymer, particularly in combination with a fiber in the case of which the core is made from fused quartz glass. In addition, due to the similar materials here, notably few flaws occur at the boundary layer between the core and recess so that inordinate absorption of light is prevented. Furthermore, advantageously, great heating of the device during operation and the, therewith, possible accompanying damage is thereby prevented. An increased absorption of light in the fiber could lead to damage particularly in the case of generally preferably used light intensities in the case of an output in the range of approximately 10 W.

Fittingly, a percentage of the scattering particles in the total scattering material lies in the range of a few vol.-%, preferably in the range of between 1 to 10 vol.-% and particularly in the range of 2 to 5 vol.-%, specially at 3 vol.-%. A suitable scattering effect in the case of simultaneous optimal transparency of the scattering material is thus ensured on the whole. The remaining portion is advantageously exclusively the base material.

Scattering elements are preferably designed to be spherical due to which a boundary layer emerges which results in optimal dispersion of light during operation. By the term spherical, it is particularly understood that a respective scattering element is basically designed with a curvilinear boundary layer which preferably follows a virtual sphere or generally an ellipsoid, but is, nevertheless, not completely spherical or ellipsoid due to the peripheral location and is only essentially spherical or an ellipsoid. Due to its peripheral location, the scattering element usually exhibits a shape that corresponds to a truncated sphere or a truncated ellipsoid. The scattering element is, for all intents and purposes, cut by adjacent spatial expansion of the fiber in a radial direction so that a part of the virtual sphere, generally of the virtual ellipsoid, lies outside the fiber and the scattering element is, for example, shaped as an open cavity or hollow space in the fiber in a radial direction. The truncated part of the virtual sphere is, thereby, preferably significantly smaller than the actual scattering element. In other words, when measured in a radial direction, the scattering element exhibits a diameter that, due to the peripheral location, is less than a spherical diameter of the virtual sphere which follows the boundary layer, whereby the diameter amounts to at least 50% and preferably at least 75%, especially preferred at least 90% of the spherical diameter.

Generating scattering elements through punctiform machining with a laser beam is generally preferred. As an alternative to these rather punctiform, essentially spherical scattering elements, these are elongated and designed as notches, for example. In another suitable alternative, scattering elements are designed as closed, radially located rings and, consequently, then function in the manner of a cylindrical lens.

Scattering elements preferably exhibit an expansion in the range of 20 to 500 μm, especially in the range of 150 to 300 μm. Dimensions in the case of an essentially spherical scattering element then correspond to the diameter of the sphere. In the case of elongated scattering elements such as notches, for example, the expansion corresponds to a longitudinal extension i.e. especially to the longest expansion. With reference to the wavelength of the light, the scattering element is, thus, approximately one or two times larger in order of magnitude and, thus, exhibits macroscopic dimensions. In comparison to the fiber, the expansion then preferably amounts to approximately one-tenth to half of the diameter of the fiber. This preferably lies in the range of 125 to 1500 μm, especially in the range of 500 to 700 μm.

The core in the case of a fiber with a surrounding sheath, also referred to as cladding, exhibits a core diameter and the sheath exhibits a sheath gauge that corresponds, for example, to at least one-twentieth and, at the most, to half the core diameter. A typically suitable fiber exhibits a core diameter of 600 μm, for example, and a sheath gauge of 30 μm, i.e. a fiber diameter of 660 μm. The ratio of sheath diameter, i.e. diameter with sheath, thus, the fiber diameter in particular to the core diameter, is also specified as CCDR or more precisely as cladding-to-core-diameter-ratio. The diffuser segment described here is thereby independent of a specific CCDR value. The fiber, however, preferably exhibits a CCDR value in the range of 1.04 to 9.8, especially in the range of 1.04 to 2.5.

The scattering elements project in a radial direction into the fiber up to a specific depth. The depth is thereby measured in a radial direction i.e. perpendicular to the longitudinal direction. Due to the abovementioned peripheral positioning, the depth, especially in the case of the spherical scattering elements, is correspondingly less than the expansion of scattering elements in the longitudinal direction. The scattering element conveniently exhibits a depth in the range of 15 to 450 μm, especially in the range of 100 to 250 μm. Especially good access for the purpose of filling with scattering material is achieved particularly in the case of scattering elements with recesses; the recesses thus particularly exhibit a sufficiently large opening or aperture for the purpose of filling on the fiber surface area.

Distribution of the scattering elements along the diffuser segment is of particular significance for an especially homogenous, i.e. diffuse, light emission. Thus, the scattering elements are preferably distributed in the peripheral direction as well as in the longitudinal direction of the fiber for even emission of light in a radial direction. An especially even emission is achieved in the radial direction by this location distributed in the peripheral direction; an especially even emission is achieved along the longitudinal direction as a result of the distributed location in the longitudinal direction. Scattering elements in an appropriate configuration are located in such a manner for this purpose around the fiber that two adjacent scattering elements are located offset to one another in the peripheral direction as well as in the longitudinal direction. Two scattering elements as a pair are respectively located opposite one another at the same length position along the longitudinal direction in an appropriate alternative and the following pair is located rotated by 90° in the peripheral direction.

The proportion of light that is perpetuated in the direction of the distal end during propagation of light increases significantly due to radial emission. In order to, nevertheless, ensure even scattering intensity in the radial direction, scattering elements are preferably located at varied distances to one another in the longitudinal direction.

Scattering elements are preferably located at distances in the range of 100 to 1000 μm to one another in the longitudinal direction. An optimal measure of scattered intensity is thereby achieved relative to perpetuated intensity, especially in the case of a diffuser segment whose length, i.e., the diffuser length, lies in the range already specified above.

A configuration of the type where the distances decrease towards the distal end, i.e. an ever increasing proportion of the as-yet perpetuated light is scattered out of the fiber towards the distal end, is thereby particularly preferred. The distance between two sequential scattering elements in the longitudinal direction towards the distal end is generally reduced by preferably at least 1% to a maximum of 70%, especially at least 5% to a maximum of 50%, especially a maximum of 30%. The distance in an appropriate embodiment is continuously reduced i.e. with reference to the respective previous distance. In a second appropriate embodiment, the diffuser segment in contrast exhibits several segments, whereby the scattering elements are equally distanced from one another on the respective segment but the distance in the subsequent segment is, however, reduced vis-à-vis the distance of the previous segment. The distance between two scattering elements on one respective segment does not vary. As a result, the manufacture of the diffuser segment is particularly simplified. For example, the diffuser segment exhibits three segments with respectively ten scattering elements whereby the distance in the longitudinal direction between two adjacent scattering elements on the first segment amounts to 600 μm, 550 μm on the second segment and only 200 μm on the third, in particular, distal segment.

Basically, subject to the application of the device, an appropriate design of the type in which even light emission does indeed take place along the longitudinal direction but not, however, in the radial direction is conceivable, i.e. the scattering elements are only appropriately distributed in the longitudinal direction and not, however, in the peripheral direction. This type of device thus exhibits a radial predominant direction, thus radiates peripherally only in a specific and restricted angular range. This type of device is particularly suited for lighting applications.

The fiber and especially the scattering material too are appropriately surrounded by an outer sheath, which is preferably manufactured from a biocompatible material, especially when using the device in a medical connection, in particular in the case of intra-corporeal application. The outer sheath particularly forms an outermost layer and restriction for the device at least on the diffuser segment and potentially comes into contact with the environment during operation. The material is, therefore, preferably selected with this taken into consideration but is simultaneously sufficiently transparent to ensure propagation of a light emission in the radial direction.

An embodiment of the type where the outer sheath is a closed glass capillary at one front side i.e. at the distal end, said glass capillary distinguishing itself particularly by its bio-compatibility and, in addition, connecting firmly to a scattering sheath made from silica gel during manufacture is particularly preferred. Alternatively or additionally, a metal coating from gold can be provided, for example, which then preferably exhibits a layer thickness of a maximum of 500 nm.

The invention preferably finds application in the framework of medical diagnosis, medical treatment, for lighting or for examination or machining of a component or tool or generally in the case of a medical application or industrial application. Due to the only minimal radial dimension of the fiber and the function sheath and/or layers surrounding it, the device is particularly suited to a configuration for an endoscope or for the purpose of examination or treatment of particularly difficult-to-access locations as a probe that can be inserted into a hollow space such as, for example, for ablation of calcifications in a blood vessel or to irradiate intestinal tumors. The use of the device, especially as a probe, is not however restricted to medical applications. The device is in fact also suitable for industrial applications. One such industrial application and non-medical application is, for example, monitoring of an internal combustion engine. Depending upon the application, the device preferably consists, in addition, of an appropriate control unit with a port for the fiber.

With the above and other objects in view there is also provided, in accordance with the invention, a process for manufacturing the fiber-optic device as described above. The process comprises:

providing an optical fiber; and forming a plurality of recesses into the optical fiber with a laser.

For the manufacture of the device, an optical i.e. a fiber designed to guide light, is in particular made available, in which a number of scattering elements are inserted by means of a laser. Utilization of a laser considerably simplifies manufacture and results, in addition, in an especially precise formation of scattering elements. Fiber material is removed in particular by ablation during laser machining and thermally processed and an especially essentially spherical scattering element is produced in this manner. Machining preferably takes place in the radial direction so that the scattering element in the peripheral location of the fiber projects from the fiber's surface area towards the interior i.e. right up to the core. An opening or aperture is produced, in particular, on the fiber surface area through which the ablated material escapes and through which the scattering element is subsequently accessible.

The scattering elements are filled with scattering material during application of the scattering material in another preferred improvement.

The diffuser segment and its manufacture are, advantageously, independent of the precise configuration of the fiber, especially its CCDR as well as its numerical aperture. A broad spectrum of conventional fibers can, therefore, be used as a basic fiber and furnished with a diffuser segment in the manner described above. The manufacturing process is thus, in particular, very flexible.

Other features which are considered as characteristic for the invention are set forth in the appended claims.

Although the invention is illustrated and described herein as embodied in a fiber-optic device and a process for the manufacture of the same, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
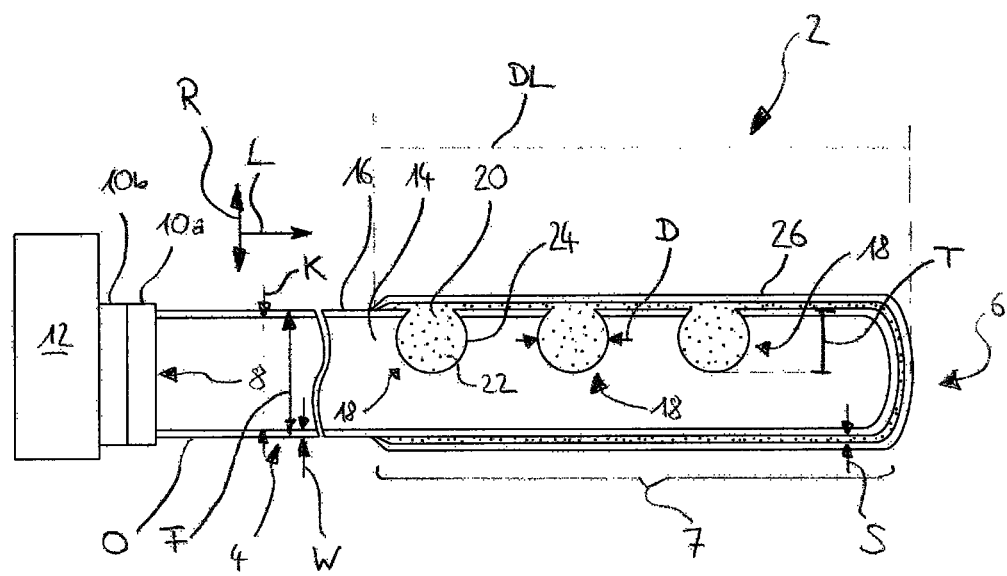
FIG. 1 is a view of a fiber-optic device.

Referring now to the figures of the drawing in detail and first, particularly, to FIG. 1 thereof, there is shown a fiber-optic device 2, which is particularly designed as a medical therapeutic device. The device 2 comprises a fiber 4 that exhibits a diffuser segment 7 at its distal end 6. The fiber 4 has a first coupling element 10a at its other end that is also termed the coupling end, by means of which the fiber 4 is connected to a second coupling element 10b of a control unit 12.

The fiber 4 extends in the longitudinal direction L from the coupling end 8 to the distal end 6 and comprises, in particular, a central core 14 as well as a sheath 16 that surrounds the core for guiding of light in the longitudinal direction L by means of total reflection at the boundary layer between the core 14 and the sheath 16. The diffuser segment 7 is located at the end side of the fiber 4 and, in addition, exhibits a number of scattering elements 18 which are distributed in the longitudinal direction L here. Furthermore, a scattering material 20, which contains a plurality of scattering particles 22, is applied on the fiber.

The respective scattering element 18 thereby comprises a recess 24 that, starting from the fiber surface area O, projects through the sheath 16 into the core 14. Recesses 24 here are designed to be spherical and have a specific expanse dimension D that corresponds to the diameter of a virtual sphere. The recesses 24, in addition, exhibit a specific depth T or even depth of penetration into the fiber 4 in radial direction R, i.e., perpendicular to the longitudinal direction L, which is correspondingly smaller than expanse D due to the particularly clearly distinguishable peripheral location of the recesses 24 with regard to the fiber 4. In the embodiment shown here, the expanse D corresponds to approximately 220 μm and depth T to approximately 200 μm. The fiber 4, on the whole, has a fiber diameter F that corresponds to approximately 660 μm, whereby the sheath 16 exhibits a wall thickness W of approximately 30 μm, the core thus a core diameter K of approximately 600 μm. The entire diffuser segment here has a diffuser length DL of approximately 5 cm, whereas the entire fiber 4 is significantly longer, for example, 50 cm when measured from the coupling end 8 up to the distal end 6.

Scattering material 20 here is applied continuously onto the fiber 4, i.e. it surrounds the fiber 4 on the diffuser segment 7 completely, especially on the front side at the distal end 6. A scattering sheath with a layer thickness S that amounts here to approximately 10 μm is built in this manner on the fiber surface area S. Scattering material 20 is, additionally, surrounded by an outer sheath 26 in FIG. 1 that is also designed here only on the diffuser segment 7 and forms an outer sheath for the device 2. The outer sheath 26 here is manufactured from a biocompatible material such as glass, particularly with medical applications in mind since this part could potentially come into contact with tissue during use.

Figure 2:
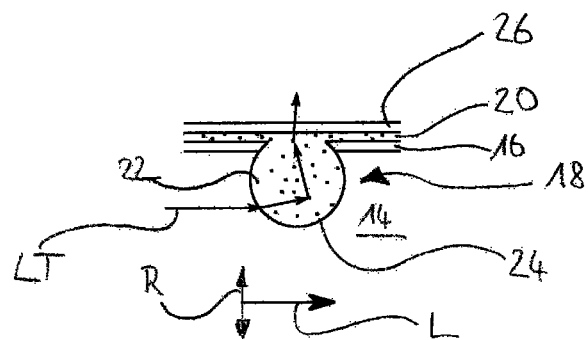
FIG. 2 is a partial view showing a scattering element of the fiber-optic device.

FIG. 2 presents sections of a scattering element 18 pertaining to the device 2 and showcases a possible light path for light LT guided in the core 14 of the fiber 4 in the longitudinal direction L. The double mode of operation of the scattering element 18 due to the configuration as a recess 24 filled with scattering material 20 is clearly identifiable. Light LT impinging upon the boundary layer between the core 14 and the recess 24 is first broken into, in a manner of speaking, due to the difference in the refractive index of materials used in the scattering element 18 and then undergoes additional scattering through the scattering particles 22 embedded in the scattering material 20. Light LT is decoupled at least partially from the fiber 4 in the radial direction R in this manner.

Figure 3A:
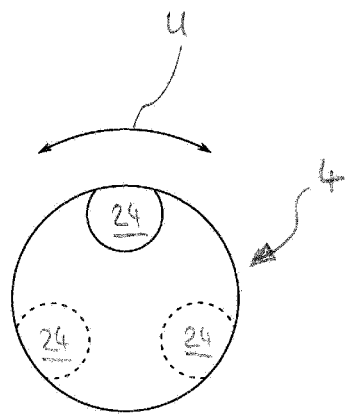
FIG. 3A a front view of a variant of the configuration of several scattering elements.
Figure 3B:
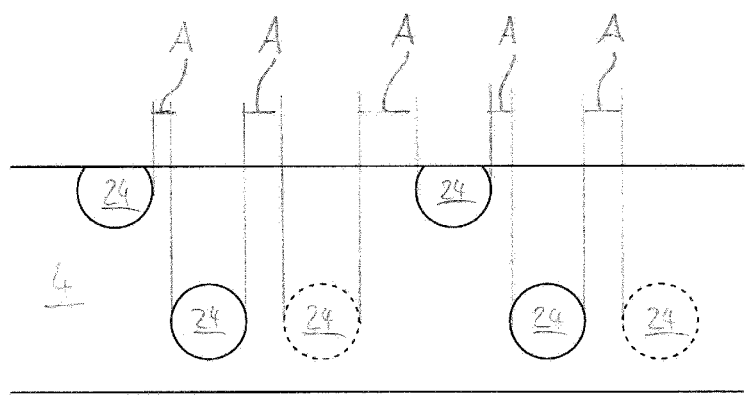
FIG. 3B side view of the configuration in accordance with FIG. 3A.

A greatly simplified illustration of an appropriate location of several recesses 24 along the diffuser segment 7 is presented in FIGS. 3A and 3B. That the recesses 24 are located evenly distributed in the peripheral direction U and, in fact, offset to one another at an angle of 120° is clearly visible. FIG. 3B presents a side view of the fiber 4, which shows that the recesses are also distributed in the longitudinal direction L and, in fact, at a spacing distance A relative to one another. In addition, the spacing distance A varies in the longitudinal direction L. Recesses 24 in the embodiment presented in FIGS. 3A and 3B are, on the whole, distributed in a helix-like manner in the longitudinal direction L.

Figure 3C:
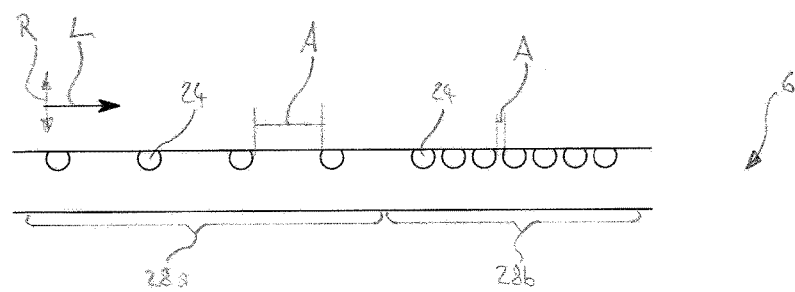
FIG. 3C is a view of another variant of a configuration of several scattering elements.

FIG. 3C presents an alternative configuration of several recesses 24 on the diffuser segment 7, whereby two segments 28a, 28b are designed here on which several recesses 24 are located respectively. Recesses 24 are respectively located at the same distance A on the given segment 28a, 28b. Distance A is, however, reduced on the distal segment 28b vis-à-vis distance A on the other segment 28a. The intensity of light LT is reduced on the distal segment 28b due to partial scattering that has already taken place on segment 28a so that more light LT must be decoupled in order to achieve even scattering intensity in radial direction R. Recesses 24 on this distal segment 28b are, therefore, designed with a higher density so that intensified scattering also takes place.

Figure 4:
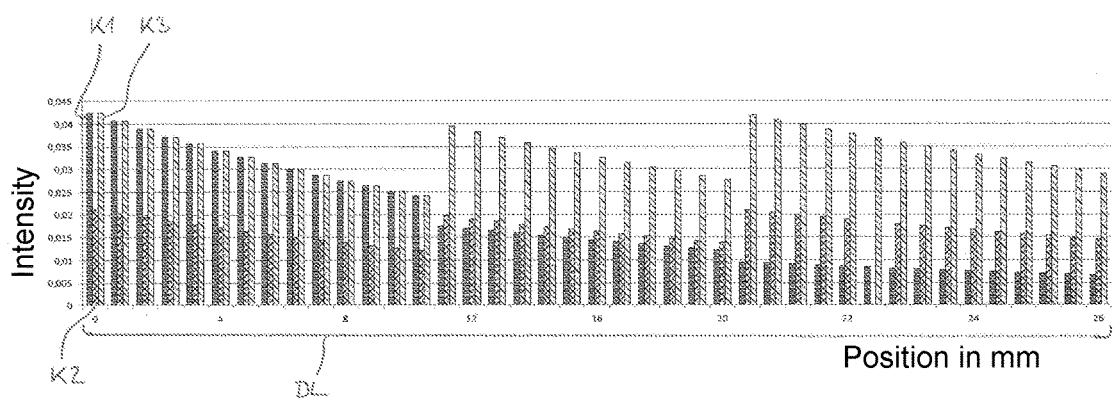
FIG. 4 is a graph of measured light diffusion in radial direction as a function of the position in longitudinal direction for an embodiment of the device.

FIG. 4 is the result of a computation of the expected light intensity emitted in radial direction R as a function of the position along the longitudinal direction L on diffuser segment 7. The intensity is thereby presented for three different configurations K1, K2 and K3 of the diffuser segment 7 and respectively standardized. The first configuration K1 located at the left in a respective three-bar-configuration is, for comparison, a fiber 4 only without scattering elements 18. Configurations K2 and K3, in contrast, present the expected radiation for a diffuser segment 7 that is designed similar to the example in FIG. 3c with several, here three, segments 28a, 28b on which respectively a different distance A is present between the subsequent scattering elements 18. Configuration K2 presents the result for a fiber 4 in which only recesses 24 have been inserted as scattering elements 18 and is shown in the centre in the respective three-bar-configuration. The remaining third configuration K3 shown on the right respectively then presents the radiation as a function of the position for scattering elements 18 in the case of which recesses 24 are filled additionally with scattering material 20. That a homogeneous radiation of light LT is achieved in configurations K2 and K3 when compared to configuration K1 due to scattering elements 18 over the entire diffuser length DL of diffuser segment 7 is clearly identifiable.

Figure 5A:
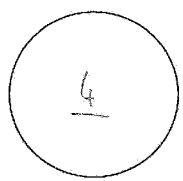
FIGS. 5A to 5D illustrate steps pertaining to a process for the manufacture of the device.
Figure 5B:
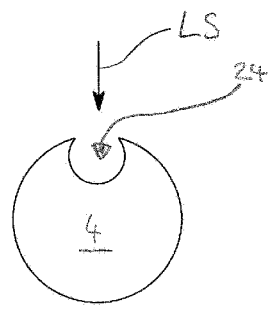

Steps pertaining to a process for the manufacture of the device 2, especially of the diffuser segment 7, by machining of fiber 4 are presented, in conclusion, in FIG. 5A to 5D. The sequence of the steps of the process, thereby, corresponds to the sequence of FIGS. 5A, 5B, 5C and 5D. As shown in FIG. 5A, a fiber 4 is first made available. FIG. 5B presents insertion of a recess 24 by way of a laser that is not illustrated here, whose laser beam LS removes a part of the fiber 4. An approximately spherical recess 24 is produced in this manner.

Figure 5C:
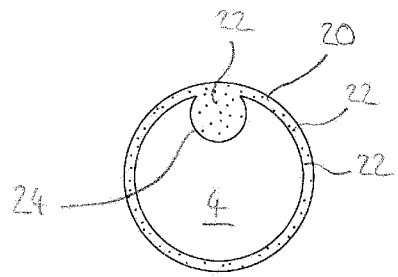
Figure 5D:
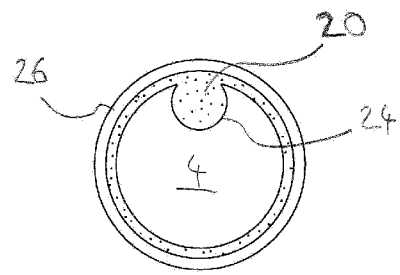

As shown in FIG. 5C, scattering material 20, which comprises a matrix from a base material that is preferably silica gel in which scattering particles 22, preferably nanoparticles from aluminum oxide, are embedded, is subsequently applied onto the fiber 4. FIG. 5D then illustrates how an outer sheath 26 is placed on the entire configuration. The outer sheath completely envelopes the diffuser segment 7 here and thus prevents contact of the scattering material 20 with the environment.

The following is a summary list of reference numerals and the corresponding structure used in the above description of the invention:
2 Fiber-optic device
4 Fiber
6 Distal end
7 Diffuser segment
8 Coupling end
10a First coupling element
10b Second coupling element
12 Control unit
14 Core
16 Sheath
18 Scattering element
20 Scattering material
22 Scattering particle
24 Recess
26 Outer sheath
28a Segment
28b Distal segment
A Distance
D Expanse dimension
DL Diffuser length
F Fiber diameter
K Core diameter
K1, K2, K3 Configuration
L Longitudinal direction
LS Laser beam
LT Light
O Fiber surface area
R Radial direction
S Layer thickness
T Depth
U Peripheral direction
W Wall thickness

The invention claimed is:
1. A fiber-optic device, comprising:
an optical fiber extending in a longitudinal direction to a distal end, said optical fiber having a core;
a diffuser segment located at said distal end of said optical fiber, said diffuser segment formed with a plurality of scattering elements projecting into said core and being configured for radially decoupling light from the optical fiber; and
a glass capillary surrounding said optical fiber.
2. The device according to claim 1, wherein each of said scattering elements comprise a recess.
3. The device according to claim 2, wherein said optical fiber is a PCS or HPCS fiber.
4. The device according to claim 2, wherein said recesses are spherical.
5. The device according to claim 2, wherein said recesses have an expanse dimension in a range of 20 to 500 μm in the longitudinal direction.
6. The device according to claim 2, wherein said recesses have a depth in a range of 15 to 450 μm in a radial direction.
7. The device according to claim 2, wherein said recesses formed in said diffuser segment are distributed in a peripheral direction and in the longitudinal direction of said optical fiber for an even emission of light in a radial direction.
8. The device according to claim 2, wherein said recesses are formed at spacing distances from one another in the longitudinal direction in a range of 100 to 1000 μm.
9. The device according to claim 2, wherein said recesses have varied spacing distances therebetween for even emission of light along the longitudinal direction.
10. The device according to claim 9, wherein said spacing distances decrease towards said distal end.
11. The device according to claim 1, wherein each of said scattering elements is formed as a region of said core with a modified refractive index.
12. The device according to claim 1, which comprises a scattering material having a matrix of scattering particles embedded in said matrix for scattering light, said scattering material being applied on said optical fiber.
13. The device according to claim 12, wherein each of said scattering elements comprise a recess filled with said scattering material.
14. The device according to claim 12, wherein said scattering material is continuously applied on said optical fiber.
15. The device according to claim 14, wherein said scattering material forms a scattering sheath that envelops said distal end of said optical fiber adjacent said diffuser element.
16. The device according to claim 14, wherein said scattering material forms a scattering sheath and produces a constant diameter of said optical fiber.
17. The device according to claim 12 wherein said scattering particles are nanoparticles having an average diameter in a range of 10 to 100 nm.
18. The device according to claim 12, wherein said scattering particles amount to at least 3 vol.-% of said scattering material.
19. The device according to claim 1, configured for a technical application selected from the group consisting of medical diagnosis, medical treatment, and lighting and examination or machining of a component or tool.
20. A process for manufacturing a fiber-optic device, the process comprising:
providing an optical fiber;
forming a plurality of recesses into the optical fiber with a laser;
to produce the fiber-optic device according to claim 1.
21. The process according to claim 20, which further comprises subsequently applying scattering material, at least area-wise, on the optical fiber.
22. The process according to claim 21, which comprises filling the recesses with the scattering material during the application of the scattering material.
23. The device according to claim 1, wherein said optical fiber has a front side and said glass capillary surrounds only said front side of said optical fiber.
24. The device according to claim 1, wherein said optical fiber has a surface, and each of said scattering elements comprise a recess that forms a micro-lens inside said optical core and has a diameter which is wider inside said core than on said surface of said optical fiber.

* * * * *